United States Patent
Kiger, II

(10) Patent No.: US 6,327,365 B1
(45) Date of Patent: Dec. 4, 2001

(54) ACOUSTIC COUPLING PRODUCT LABEL AND METHOD OF USING

(75) Inventor: Russel C. Kiger, II, Lexington, SC (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 08/962,406

(22) Filed: Oct. 31, 1997

(51) Int. Cl.[7] .................... H04M 1/00; H04M 11/00
(52) U.S. Cl. ............................ 379/357.03; 379/93.37
(58) Field of Search .................... 379/355, 93.37, 379/93.26, 106.01, 418, 444, 447, 456

(56) References Cited

U.S. PATENT DOCUMENTS

| | | |
|---|---|---|
| 3,592,966 | 7/1971 | Hansen . |
| 3,597,543 | 8/1971 | Mallebrein . |
| 3,617,639 | 11/1971 | Propper . |
| 3,733,437 | 5/1973 | Keith . |
| 3,819,862 | 6/1974 | Hedges . |
| 4,020,287 | 4/1977 | Wilkerson . |
| 4,126,768 | 11/1978 | Grenzow . |
| 4,799,254 | 1/1989 | Dayton et al. . |
| 4,893,335 * | 1/1990 | Fuller et al. ............. 379/355 |
| 4,975,948 * | 12/1990 | Andresen et al. ............. 379/355 |
| 4,980,910 | 12/1990 | Oba et al. . |
| 4,995,077 | 2/1991 | Malinowski . |
| 5,099,507 | 3/1992 | Mukai et al. . |
| 5,136,632 | 8/1992 | Bernard . |
| 5,210,790 | 5/1993 | Lin . |
| 5,216,228 | 6/1993 | Hashimoto . |
| 5,245,652 | 9/1993 | Larson et al. . |
| 5,343,519 | 8/1994 | Feldman . |
| 5,440,622 | 8/1995 | Yuki . |
| 5,452,352 | 9/1995 | Talton . |
| 5,454,350 | 10/1995 | Betheil . |
| 5,506,892 | 4/1996 | Kojima et al. . |
| 5,553,123 | 9/1996 | Chan et al. . |
| 5,583,933 | 12/1996 | Mak . |
| 5,640,447 * | 6/1997 | Fonseca ............. 379/144 |
| 5,671,271 * | 9/1997 | Henderson et al. ............. 379/355 |
| 5,774,529 * | 6/1998 | Johannsen et al. ............. 379/93.37 |
| 5,854,828 * | 12/1998 | Kocis et al. ............. 379/93.37 |

* cited by examiner

Primary Examiner—Stella Woo
(74) Attorney, Agent, or Firm—Charlene L. Stukenborg

(57) ABSTRACT

An acoustic coupling product label including a product identification number and/or other pertinent service information is provided which uses a standard telephone to provide information to a computerized product support system.

17 Claims, 2 Drawing Sheets

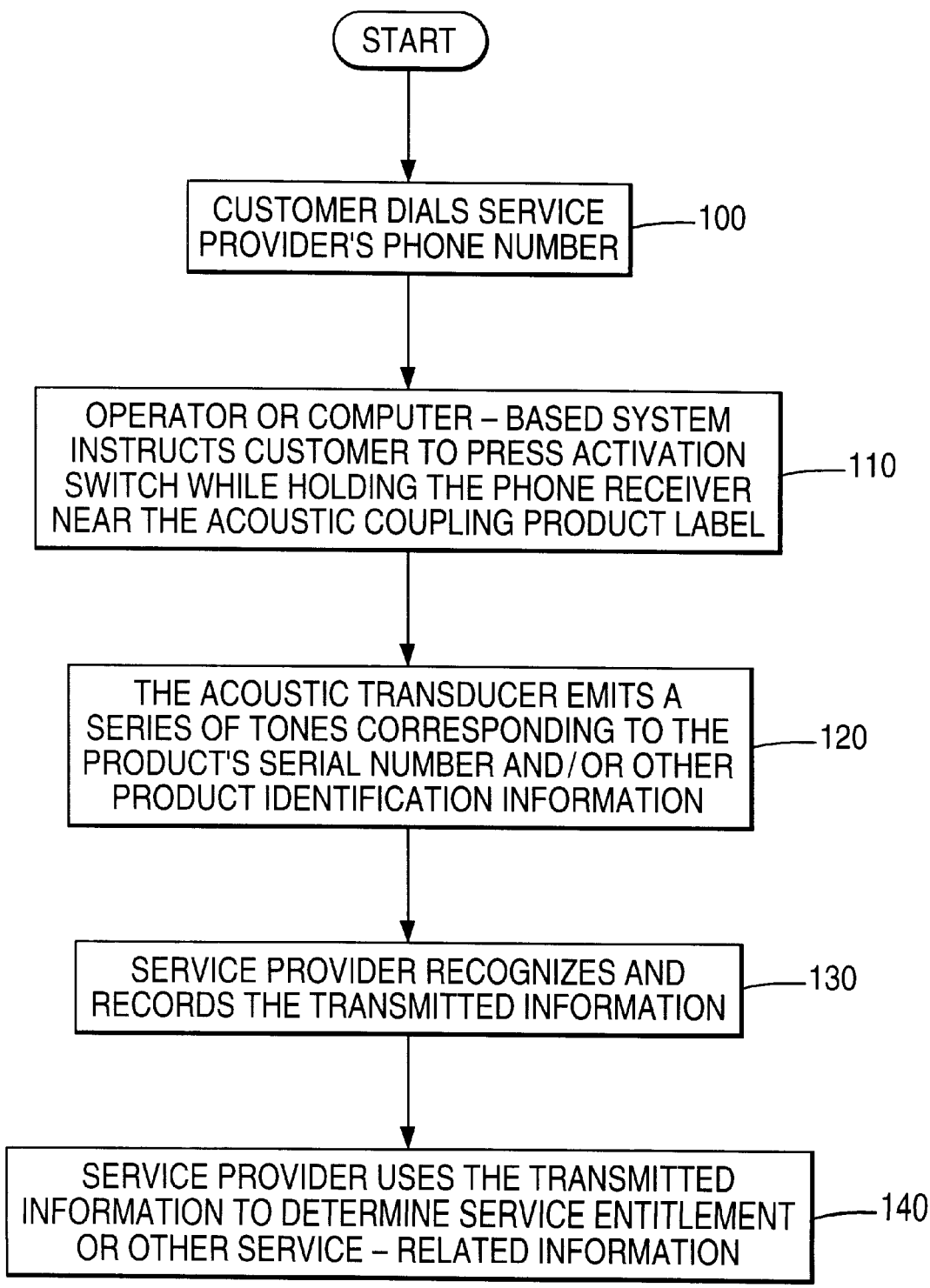

ACOUSTIC COUPLING PRODUCT LABEL AND METHOD OF USING

BACKGROUND OF THE INVENTION

The present invention relates to an acoustic coupling product label and a method for using the label.

The capture of a product's serial number at the beginning of a service call is generally a cumbersome and costly process for companies that provide service on hardware products such as computer systems, computer-controlled machinery and the like. The product's serial number is needed for several reasons, including validation of the customer's entitlement to service and determination of the parts that may be needed so most service providers try to get customers to provide the product's serial number during the initial phone call.

However, the regulations from product-certification organizations such as UL (Underwriter Laboratories Inc.), CSA (Canadian Standards Association), and VDE (Verband Deutscher Elektrotechniker), specify that the printed serial number label must be attached to the frame of the product, near its power source, which is usually on or near the base of the product. Unfortunately this placement of the printed serial number label may cause difficulty for the customer trying to find the desired product serial number in a timely and accurate manner so the serial number may be given to the service provider. Also, a product's serial number may be hidden by mounting equipment requiring burdensome disassembly, such as having to remove a cash register from its mounting in a check-out stand.

There is a need to provide a product label for assisting customers in providing a product's serial number and/or other identification or related information easily and accurately during a service call, preferably near the beginning of the service call.

SUMMARY OF THE INVENTION

In accordance with the teachings of the present invention, an acoustic coupling product label including a product serial number or identification number and/or other pertinent service information is provided which uses a standard telephone to provide information to a computerized product support system.

It is an important feature of the present invention that the acoustic coupling product label is mounted on the front or other easily accessible surface or location of the product to be serviced.

Another important feature of the present invention is that the acoustic coupling product label provides the product serial number or other identification number and other service information using a standard telephone so that the product support provider can efficiently process the service call leading to improved customer satisfaction.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flowchart of the method of the present invention.

DETAILED DESCRIPTION

Figure 1:
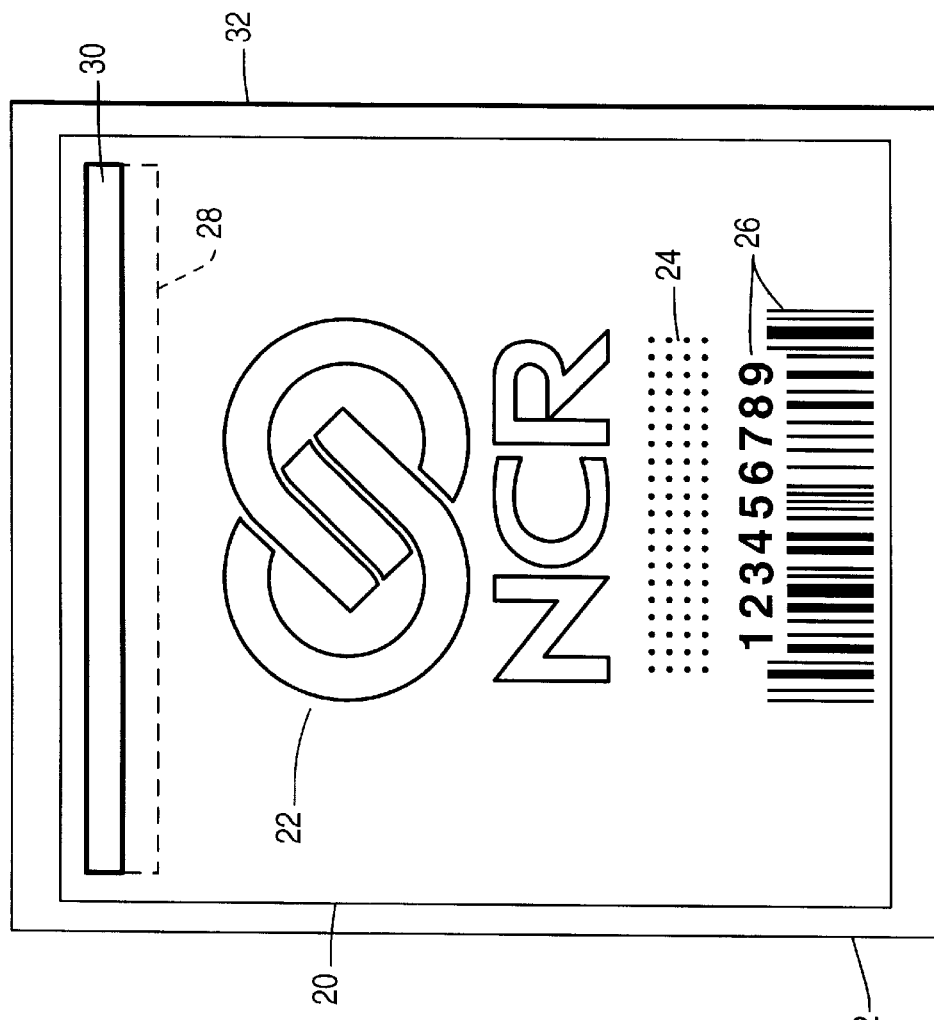
FIG. 1 is a diagram of a preferred embodiment of the acoustic coupling product label system according to the present invention.
Figure 1:
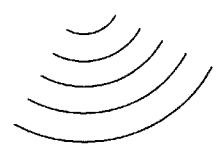
Figure 1:
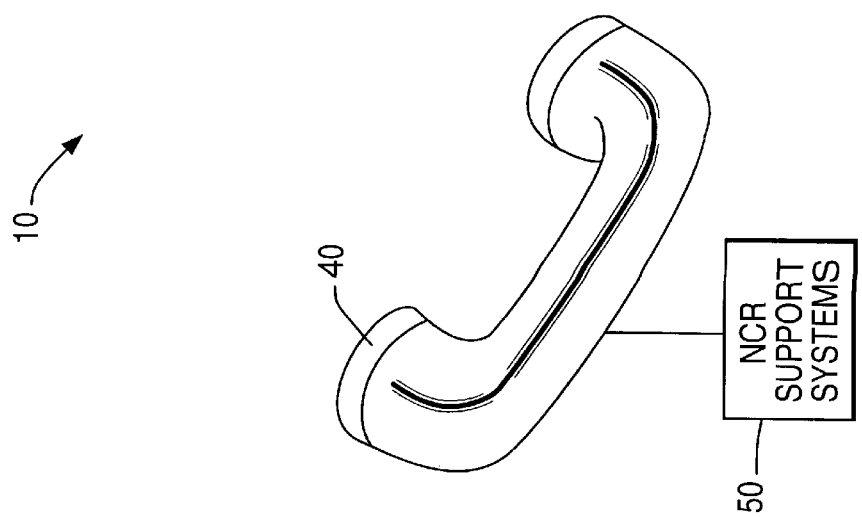

Referring now to the drawings, in which like-referenced characters indicate corresponding elements throughout the several views, attention is first drawn to FIG. 1 which shows a diagram of a system including an acoustic coupling product label according to a preferred embodiment of the present invention.

A preferred embodiment of the system 10 of the present invention includes an acoustic coupling product label 20, a standard telephone 40 at the customer site, and a computerized support system 50. The acoustic coupling product label 20 is mounted on a product 32 in a relatively easily accessible location. The acoustic coupling product label 20 includes an activation switch 22, an acoustic transducer or speaker 24, and a label power source 28. The acoustic coupling product label may also include a product serial number or other product identification number 26. The product identification number 26 may be in human readable form such as Arabic numbers or in bar code form to be read by a scanner.

Acoustic coupling product label 20 can be formed of any standard components currently used to provide credit card or business card sized automatic dialers such as those described in U.S. Pat. No. 4,995,077 issued to Malnowski and U.S. Pat. No. 5,343,519 issued to Feldman which are hereby incorporated by reference. Acoustic coupling product label 20 also preferably includes a memory for storing at least the product identification number or other product identification information which is to be transmitted to the service provider.

The label power source 28 may be a battery power source or a solar power source from a solar collector 30 and is preferably a combination of the two types of power sources. The power source 28 for the acoustic coupling product label is preferably independent from the product's power source so that it is always readily available. The power source also preferably includes a small rechargeable battery to supply the label with a short burst of energy greater than the collector alone can supply.

The activation switch 22 is preferably blended into the label such as a raised area under the company logo as shown in FIG. 1. The raised label preferably has a flexible area in the surface for engaging the activation switch 22 when slight pressure, as by a fingertip, is applied. Obviously, any type of switch may be used which fits compactly onto the label. Preferably the switch 22 is hidden behind a decal or insignia on the label. Although FIG. 1 shows a preferred embodiment of the acoustic coupling product label 20, it is contemplated that various configurations of an acoustic coupling label fall within the scope of the following claims.

The system 10 also includes a standard telephone 40 over which the tones emitted by the acoustic transducer or speaker 24 of the acoustic coupling product label 20 are provided to the product support system 50. The product support system 50 preferably includes a computerized answering system to recognize and record the information provided by the acoustic coupling product label 20 and to notify the appropriate service personnel.

Referring to FIG. 2, in operation, when a product to which an acoustic coupling label is attached has a problem, the customer dials the service provider's phone number to request service (step 100). The customer/caller is directed by an operator or a computerized response system to press the activation area of the acoustic coupling label while holding the phone near the acoustic coupling label (step 110). The memory of the acoustic coupling label which stores the product's identification number and/or other product identification information provides the information to the acoustic transducer or speaker when power is applied which occurs when the switch is activated.

The label then emits a series of tones corresponding to the product's identification number and/or other product identification information (step 120) which the service provider's system quickly recognizes and captures (step 130). The service provider uses the transmitted information to determine service entitlement or other service-related information (step 140). This method saves the customer/caller from having to move the product or otherwise expend effort to find the product identification number or serial number, improves the accuracy of the capture of the number, and saves time for both the customer/caller and the service provider.

Referring back to FIG. 1, the low-cost acoustic coupling product label 20 transfers the product identification number or serial number over a standard phone handset to a PBX switch at the service provider. One such PBX switch is marketed under the name Conversant by AT&T of New Jersey. Such a transfer eliminates the need for special equipment (such as a modem) at the customer's site. This method also works over all styles of phone networks and PBX systems whether digital, analog or hybrid.

Additionally, if the customer/caller's PBX switch is set to not permit outside calls from the telephone located near the product which is experiencing a problem, the acoustic coupling product label 20 may emit tones that enable the PBX switch to recognize the call as an authorized service call and to allow it to be placed. (The term "outside call" is intended to indicate any calls not within the business' approved network. For example, in the retail sector, telephones at workstations may be blocked from making telephone calls to any telephones not located at other workstations at the same location.) Similarly, if a customer/caller telephone is blocked from placing long-distance calls and the service provider's telephone number is a long-distance call, the acoustic coupling product label could provide tones, recognized by the PBX switch, indicating that the call is an authorized service call and allowing the call to be connected.

Advantageously, this invention simplifies the product identification number capture routine necessary at the start of a service call.

Additionally, the acoustic coupling product label of the present invention uses a standard telephone connection and does not require the customer to purchase or provide any additional hardware such as a modem to enable the automatic capture of the serial number or other identification number or other product information.

Preferably, the acoustic coupling product label is attractive enough to mount the label conspicuously on the front of the product. The acoustic coupling product label preferably does not replace the regulatory labeling as discussed in the background section above. Preferably, to simplify the system, the actual serial number of the product may not be used, but instead a system-level connection to correlate the actual serial number and the product identification number at the service provider is used.

To provide the acoustic coupling product label functionality on existing products supported by the service provider, an acoustic coupling label can be provided as a field-installable label.

Additional information on the label could include the number printed in human readable form and in a bar code format as well.

Advantageously, the acoustic coupling label of the present invention significantly streamlines support and quality measurement operations.

Although the invention has been described with particular reference to certain preferred embodiments thereof, variations and modifications of the present invention can be effected within the spirit and scope of the following claims.

What is claimed is:

1. A system comprising:
   an acoustic coupling product label mounted on a product to be serviced, said acoustic coupling product label including a product serial number or other product identification number for the product to be serviced;
   a standard telephone; and
   a computerized product support system which collects and interprets the information provided by the acoustic coupling product label to determine entitlement to service.

2. The system of claim 1 wherein the acoustic coupling product label is mounted on the front of the product to be serviced.

3. The system of claim 1 wherein the acoustic coupling product label is mounted in an easily accessible location on the product to be serviced.

4. The system of claim 1 wherein said acoustic coupling product label includes a power source which is independent of a power source of the product to be serviced.

5. The system of claim 1 wherein said computerized product support system notifies appropriate service personnel for the product to be serviced.

6. A label for mounting on or near the front of a product or in an easily accessible location on a product to be serviced, comprising:
   an activation switch;
   a power source connected to the activation switch; and
   an acoustic transducer which emits tones corresponding to the product identification number of the product to which the label is attached when the activation switch is activated.

7. The label of claim 6 wherein the power source connected to the activation switch is independent of a power source of the product to be serviced.

8. A method for providing product information over a standard telephone line, comprising the steps of:
   providing a label including the product information for a product to be serviced, wherein the label is mounted on the product;
   locating a standard telephone receiver near the label; and
   activating the label so that tones corresponding to the product information are transmitted over the standard telephone line.

9. The method of claim 8 wherein the label is mounted on the front of the product.

10. The method of claim 8 wherein the product information includes the product serial number.

11. The method of claim 8 wherein additional tones corresponding to the telephone number of the service provider are transmitted before the tones corresponding to the product information.

12. The method of claim 8 wherein additional tones indicating that the call is an authorized service call are transmitted before the tones corresponding to the product information.

13. The method of claim 8 further including the step of dialing the service provider's phone number.

14. The method of claim 8 further including the step of recognizing and recording the transmitted information by the service provider.

15. The method of claim 14 further including the step of determining service entitlement or other service-related information by the service provider.

16. The method of claim 8 wherein the label further includes a power source which is independent of a power source of the product to be serviced.

17. The method of claim 8 further including the step of notifying the appropriate service personnel for the product to be serviced.

* * * * *